UNITED STATES PATENT OFFICE.

LOUIS HENRY ROGERS AND ALEXANDER MYERS, OF WELLINGTON, NEW ZEALAND.

COMPOSITION FOR PREVENTING LEAKAGE OF AIR THROUGH PUNCTURES IN PNEUMATIC TIRES.

No. 904,895.     Specification of Letters Patent.     Patented Nov. 24, 1908.

Application filed January 27, 1908. Serial No. 412,847.

*To all whom it may concern:*

Be it known that we, LOUIS HENRY ROGERS, a subject of His Majesty the King of Great Britain and Ireland, residing at 227 Willis street, Wellington, in the Provincial District of Wellington, Dominion of New Zealand, and ALEXANDER MYERS, a subject of His Majesty the King of Great Britain and Ireland, residing at Wellington, in the Provincial District of Wellington, Dominion of New Zealand, have invented certain new and useful Improvements in Composition for Preventing Leakage of Air Through Punctures in Pneumatic Tires, of which the following is a specification.

This invention provides a composition for preventing the escape of air through punctures in pneumatic tires.

The composition also adds to the "life" of the tires by preserving the india rubber, and consists of lime wash, or more particularly silicious lime stone which has been calcined and crushed, casein and water.

The proportions of the ingredients are as follows:—

Silicious lime stone calcined and crushed____ 87.5 parts
    Casein _____ 8.3 "

These ingredients are mixed together and water added until a consistency corresponding to cream is obtained.

An analysis of the silicious lime stone will give the following ingredients:—

Silica _____ 13.5 parts.
    Silicates insoluble in acid _____ 3.4 "
    Phosphate of calcium and alumina_____ 2.5 "
    Magnesium carbonate__ 15.6 "
    Calcium carbonate ____ 39.2 "
    Calcium hydrate_____ 13.4 "

To use the composition, about three or four ounces are introduced into the tire by means of the usual pump or otherwise. The composition remains in a liquid or semi-liquid state in the tire, and immediately a puncture occurs, the composition flows thereinto and congeals, effectually stopping the escape of air from the tire.

Having now particularly described and ascertained the nature of our said invention, and in what manner the same is to be performed, we declare that what we claim is:—

1. The herein described composition of matter consisting of silicious lime stone which has been calcined and crushed, casein and water, substantially as described and for the purpose specified.

2. The herein described composition of matter for stopping punctures in pneumatic tires, consisting of silicious lime stone which has been crushed and calcined eighty-seven and five-tenths parts, casein eight and three-tenths parts, and water in quantity sufficient to give a consistency corresponding to cream, substantially as described.

In testimony whereof we have signed our names to this specification in the presence of two witnesses.

Dated this 13th day of September, 1907.

LOUIS HENRY ROGERS.
    ALEXANDER MYERS.

Witnesses:
    J. J. WATSON,
    HENRY JOHN PRIOR.